United States Patent
Godaliyadda et al.

(10) Patent No.: US 12,541,826 B2
(45) Date of Patent: Feb. 3, 2026

(54) TEXTURE-PRESERVING HALO SUPPRESSION FOR IMAGING SYSTEMS

(71) Applicant: Samsung Electronics Co., Ltd., Suwon-si (KR)

(72) Inventors: Gunawath Dilshan Godaliyadda, Allen, TX (US); Tyler Luu, Richardson, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 18/490,505

(22) Filed: Oct. 19, 2023

(65) Prior Publication Data

US 2025/0037250 A1    Jan. 30, 2025

Related U.S. Application Data

(60) Provisional application No. 63/528,499, filed on Jul. 24, 2023.

(51) Int. Cl.
*G06T 5/75* (2024.01)
(52) U.S. Cl.
CPC ..................... *G06T 5/75* (2024.01)
(58) Field of Classification Search
CPC . G06T 2207/10024; G06T 2207/20192; G06T 5/30; G06T 5/75
See application file for complete search history.

(56) References Cited

U.S. PATENT DOCUMENTS

| | | | |
|---|---|---|---|
| 6,323,855 B1 | 11/2001 | Hamilton, Jr. et al. | |
| 9,262,816 B2 | 2/2016 | Bak | |
| 9,779,491 B2 | 10/2017 | Tezaur et al. | |
| 11,582,464 B2 | 2/2023 | Turbell et al. | |
| 2004/0201722 A1* | 10/2004 | Gomi | H04N 5/208 348/E5.076 |
| 2007/0175998 A1* | 8/2007 | Lev | H04N 1/00374 707/E17.112 |
| 2014/0085507 A1 | 3/2014 | Pillman et al. | |
| 2017/0262966 A1 | 9/2017 | Oniki et al. | |
| 2019/0028640 A1 | 1/2019 | Kanda et al. | |

(Continued)

FOREIGN PATENT DOCUMENTS

| | | |
|---|---|---|
| CN | 111161136 A | 5/2020 |
| CN | 115797238 A | 3/2023 |
| WO | 2020191475 A1 | 10/2020 |

OTHER PUBLICATIONS

Wikipedia, "Structure tensor," Mar. 2023, 33 pages.

(Continued)

*Primary Examiner* — Ming Wu

(57) ABSTRACT

A method includes obtaining, using at least one processing device of an electronic device, an input image containing blur. The method also includes generating, using the at least one processing device, an edge enhancement mask and a gain mask based on the input image. The method further includes generating, using the at least one processing device, a halo-suppressed edge mask based on the edge enhancement mask and the gain mask. In addition, the method includes generating, using the at least one processing device, a sharpened image based on the input image and the halo-suppressed edge mask.

20 Claims, 7 Drawing Sheets

(56) References Cited

U.S. PATENT DOCUMENTS

| | | | |
|---|---|---|---|
| 2019/0304073 A1* | 10/2019 | McElvain | G06T 5/94 |
| 2021/0374925 A1* | 12/2021 | Finlayson | G06V 10/454 |
| 2022/0005157 A1 | 1/2022 | Shu et al. | |
| 2022/0044364 A1 | 2/2022 | Jee et al. | |
| 2022/0207658 A1* | 6/2022 | Tong | G06T 5/70 |

OTHER PUBLICATIONS

Zhou et al., "Gradient-based Feature Extraction From Raw Bayer Pattern Images," IEEE Transactions on Image Processing, vol. 30, May 2021, 12 pages.

Lowe, "Lecture 6: Features and Image Matching," University of Washington, CSE Vision Faculty, 2004, 61 pages.

Madislav, "Anisotropic image segmentation by a gradient structure tensor," 2021, 12 pages.

International Search Report and Written Opinion of the International Searching Authority dated Aug. 5, 2024 in connection with International Patent Application No. PCT/KR2024/005784, 8 pages.

Supplementary European Search Report dated Dec. 23, 2025 in connection with European Patent Application No. 24845737.6, 8 pages.

Ngo et al., "Nonlinear Unsharp Masking Algorithm," Conference: 2020 International Conference on Electronics, Information, and Communication (ICEIC), Jan. 2020, 6 pages.

\* cited by examiner

TEXTURE-PRESERVING HALO SUPPRESSION FOR IMAGING SYSTEMS

CROSS-REFERENCE TO RELATED APPLICATION AND PRIORITY CLAIM

This application claims priority under 35 U.S.C. § 119(e) to U.S. Provisional Patent Application No. 63/528,499 filed on Jul. 24, 2023. This provisional application is hereby incorporated by reference in its entirety.

TECHNICAL FIELD

This disclosure relates generally to imaging systems. More specifically, this disclosure relates to texture-preserving halo suppression for imaging systems.

BACKGROUND

Many mobile electronic devices, such as smartphones and tablet computers, include cameras that can be used to capture still and video images. While convenient, cameras on mobile electronic devices typically suffer from a number of shortcomings. For instance, in a typical image processing pipeline, one or more images of a scene can undergo various processing operations that can ultimately reduce the sharpness of a final image of the scene. While it is possible to perform one or more additional operations that increase the sharpness of the final image, this often results in the creation of halo artifacts in the final image, which can make the final image appear unnatural. Attempting to reduce the halo artifacts can cause a loss of texture in the final image. As a result, images of scenes that are produced using image processing pipelines routinely include halos, texture losses, or a combination of both.

SUMMARY

This disclosure relates to texture-preserving halo suppression for imaging systems.

In a first embodiment, a method includes obtaining, using at least one processing device of an electronic device, an input image containing blur. The method also includes generating, using the at least one processing device, an edge enhancement mask and a gain mask based on the input image. The method further includes generating, using the at least one processing device, a halo-suppressed edge mask based on the edge enhancement mask and the gain mask. In addition, the method includes generating, using the at least one processing device, a sharpened image based on the input image and the halo-suppressed edge mask.

In a second embodiment, an electronic device includes at least one processing device configured to obtain an input image containing blur and generate an edge enhancement mask and a gain mask based on the input image. The at least one processing device is also configured to generate a halo-suppressed edge mask based on the edge enhancement mask and the gain mask. The at least one processing device is further configured to generate a sharpened image based on the input image and the halo-suppressed edge mask.

In a third embodiment, a non-transitory machine readable medium contains instructions that when executed cause at least one processor of an electronic device to obtain an input image containing blur and generate an edge enhancement mask and a gain mask based on the input image. The non-transitory machine readable medium also contains instructions that when executed cause the at least one processor to generate a halo-suppressed edge mask based on the edge enhancement mask and the gain mask. The non-transitory machine readable medium further contains instructions that when executed cause the at least one processor to generate a sharpened image based on the input image and the halo-suppressed edge mask.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to," Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a." "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
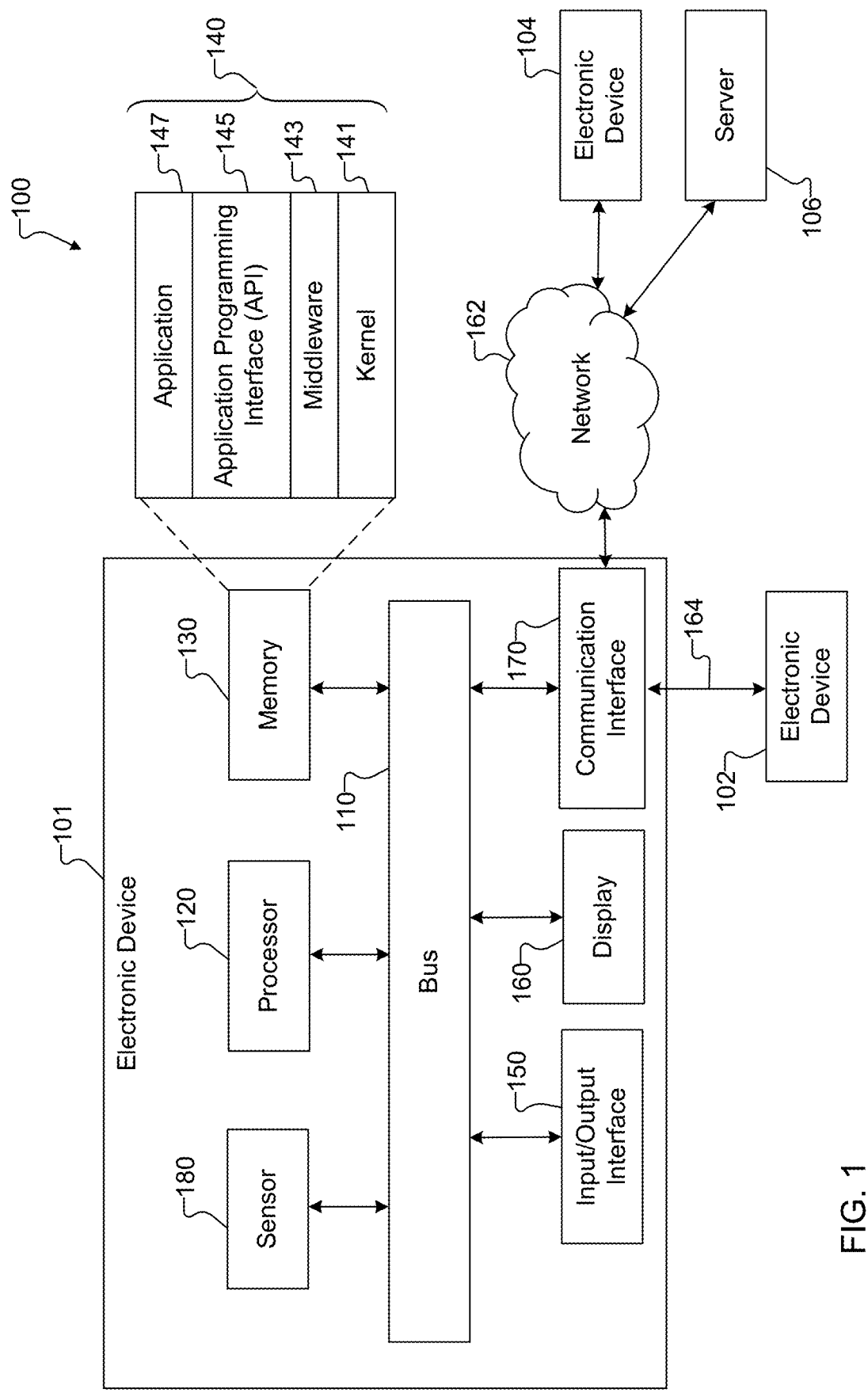
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. While convenient, cameras on mobile electronic devices typically suffer from a number of shortcomings. For instance, in a typical image processing pipeline, one or more images of a scene can undergo various processing operations that can ultimately reduce the sharpness of a final image of the scene. While it is possible to perform one or more additional operations that increase the sharpness of the final image, this often results in the creation of halo artifacts in the final image, which can make the final image appear unnatural. Attempting to reduce the halo artifacts can cause a loss of texture in the final image. As a result, images of scenes that are produced using image processing pipelines routinely include halos, texture losses, or a combination of both.

This disclosure provides techniques for texture-preserving halo suppression for imaging systems. As described in more detail below, an input image containing blur may be obtained. For example, an image processing pipeline may be used to generate the input image, such as based on one or more input image frames captured using one or more imaging sensors of an electronic device. In some cases, the input image may contain blur created by one or more operations of the image processing pipeline. An edge enhancement mask and a gain mask may be generated based on the input image. For instance, the edge enhancement mask may be generated using unsharp-masking (USM) of the input image. The gain mask may be generated based on a gradient computation performed using the input image to generate an initial edge mask, a first morphological operation performed using the initial edge mask to generate a refined edge mask, and a second morphological operation performed using the initial edge mask to generate a thickened edge mask. The refined edge mask and the thickened edge mask may be combined to generate a gain suppression mask, a gain enhancement mask may be generated based on the gain suppression mask, and the gain mask may be generated based on the gain enhancement mask and the gain suppression mask. In some cases, the gain suppression mask may be modulated based on edges in the input image, where first multiplicative values for modulating the gain suppression mask are based on at least one of edge strengths, edge coherences, and edge orientations. Also, the gain enhancement mask may be modulated based on the edges in the input image, where second multiplicative values for modulating the gain enhancement mask are based on negative enhancements or positive enhancements associated with the edges. A halo-suppressed edge mask may be generated based on the edge enhancement mask and the gain mask, such as by performing a pixel-wise multiplication of the edge enhancement mask and the gain mask. A sharpened image may be generated based on the input image and the halo-suppressed edge mask, such as by adding the halo-suppressed edge mask to the input image in order to generate the sharpened image.

In this way, it is possible to provide halo suppression in final images of scenes by applying halo-suppressed edge masks to blurry images of the scenes. The halo-suppressed edge masks help to reduce or minimize halo artifacts in the blurry images of the scenes while helping to preserve finer textural details in the images. Among other reasons, this can be accomplished by applying a gain mask to an edge enhancement mask, which reduces or minimizes the halo artifacts while helping to preserve the finer textural details. As a result, the finer textural details in the blurry images can be included in the final images of the scenes and not substantially suppressed (or suppressed to a much lesser extent) by the halo suppression. This can result in the generation of final images of scenes that are more visually appealing to users, which can significantly increase user satisfaction.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to obtain and process blurry images in order to generate final images of scenes, where part of the image processing can include texture-preserving halo suppression.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for obtaining and processing blurry images, where part of the image processing can include texture-preserving halo suppression. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 may include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to obtain and process blurry images in order to generate final images of scenes, where part of the image processing can include texture-preserving halo suppression.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
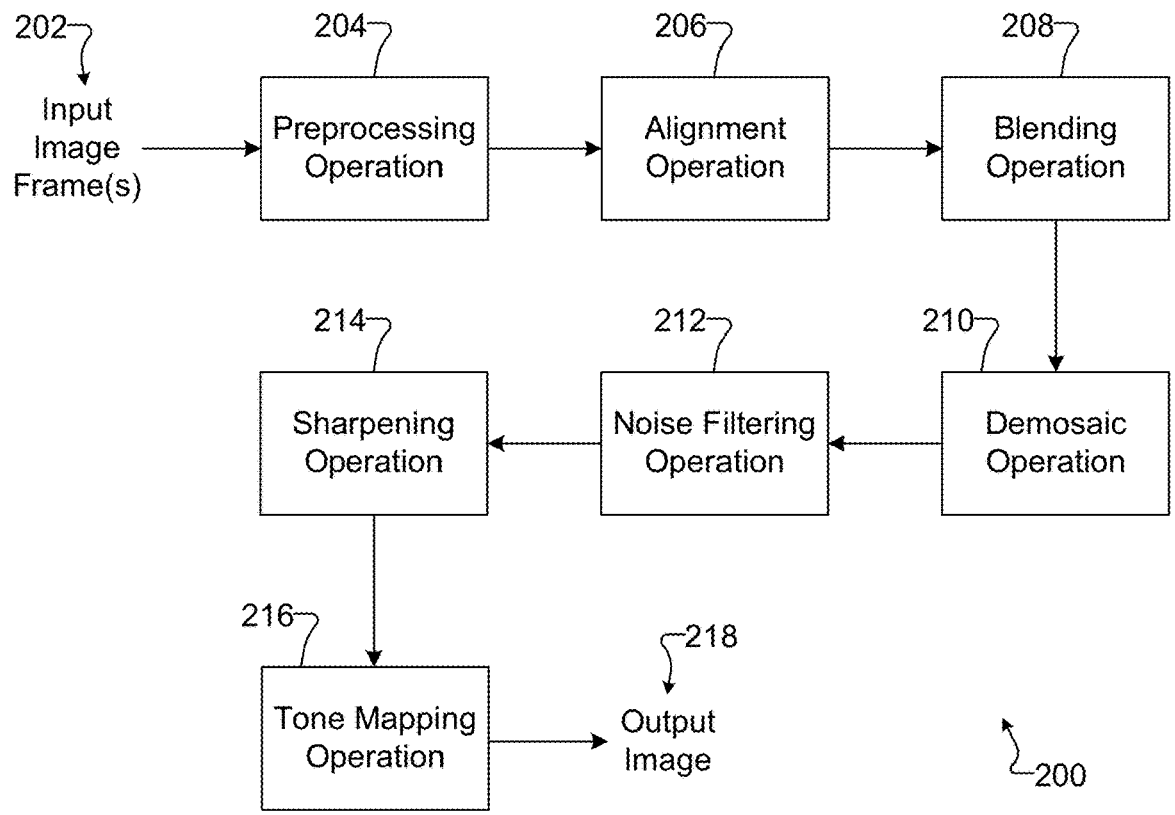
FIG. 2 illustrates an example image processing pipeline supporting texture-preserving halo suppression in accordance with this disclosure.

FIG. 2 illustrates an example image processing pipeline 200 supporting texture-preserving halo suppression in accordance with this disclosure. For ease of explanation, the pipeline 200 shown in FIG. 2 is described as being implemented on or supported by the electronic device 101 in the network configuration 100 of FIG. 1. However, the pipeline 200 shown in FIG. 2 could be used with any other suitable device(s) and in any other suitable system(s), such as when the pipeline 200 is implemented on or supported by the server 106.

As shown in FIG. 2, the image processing pipeline 200 generally receives and processes one or more input image frames 202. Each input image frame 202 may be obtained from any suitable source, such as when the one or more input image frames 202 are produced by at least one camera or other imaging sensor 180 of the electronic device 101 during an image capture operation. In some embodiments, the one or more input image frames 202 may represent one or more raw image frames. Raw image frames typically refer to image frames that have undergone little if any processing after being captured. The availability of raw image frames can be useful in a number of circumstances since the raw image frames can be subsequently processed to achieve the creation of desired effects in output images. In many cases, for example, the one or more input image frames 202 can have a wider dynamic range or a wider color gamut that is narrowed during image processing operations in order to produce still or video images suitable for display or other use. Each image frame 202 can have any suitable format, such as a Bayer or other raw image format, a red-green-blue (RGB) image format, or a luma-chroma (YUV) image format. Each image frame 202 can also have any suitable resolution, such as up to fifty megapixels or more.

In some embodiments, multiple input image frames 202 may be obtained, and the input image frames 202 may include two or more image frames captured using different capture conditions. The capture conditions can represent any suitable settings of the electronic device 101 or other device used to capture the input image frames 202 or any suitable contents of scenes being imaged. For example, the capture conditions may represent different exposure settings of the imaging sensor(s) 180 used to capture the input image frames 202, such as different exposure times or ISO settings. In multi-frame processing pipelines, for instance, multiple input image frames 202 can be captured using different exposure settings so that portions of different input image frames 202 can be combined to produce an HDR output image or other blended image. The multiple input image frames 202 can also have different image contents when capturing dynamic scenes, such as when different portions of the input image frames 202 have different luminance. In other embodiments, multiple input image frames 202 may include two or more image frames captured using common capture conditions. In the following discussion, it is assumed that the image processing pipeline 200 receives and processes multiple input image frames 202.

The input image frames 202 are processed using various operations in the image processing pipeline 200. For example, each input image frame 202 may be provided to an image preprocessing operation 204, which generally operates to process each input image frame 202 and provide desired corrections or modifications to the input image frame 202. As particular examples, the preprocessing operation 204 may perform bad pixel correction, which refers to a process for identifying image data from bad pixels of the imaging sensor(s) 180 and replacing the bad image data (such as via interpolation of neighboring good pixel data). The preprocessing operation 204 may perform lens shading correction for each input image frame 202 in order to compensate for peripheral shading created by one or more lenses used in or with one or more imaging sensors 180. The preprocessing operation 204 may perform white balance adjustment in order to modify the white balance of each input image frame 202. The preprocessing operation 204 may perform any other or additional corrections or modifications to each input image frame 202. Note, however, that this disclosure is not limited to any particular technique(s) for preprocessing image frames.

The preprocessed versions of the input image frames 202 are provided to an image alignment operation 206, which generally operates to modify one or more of the preprocessed input image frames 202 in order to generate aligned versions of the preprocessed input image frames 202. For example, the preprocessed input image frames 202 may undergo alignment so that common features in different preprocessed input image frames 202 are at the same or substantially the same locations in the aligned versions of the preprocessed image frames 202. In some embodiments, the alignment operation 206 may select a reference image frame and modify one or more non-reference image frames so as to be aligned with the reference image frame. In some cases, for instance, the alignment operation 206 generates a warp or alignment map for each non-reference image frame, where each warp or alignment map includes or is based on one or more motion vectors that identify how the position(s) of one or more specific features in the associated non-reference image frame should be altered in order to be in the position(s) of the same feature(s) in the reference image frame. Alignment may be needed in order to compensate for misalignment caused by the electronic device 101 moving or rotating in between image captures, which causes objects in the input image frames 202 to move or rotate slightly (as is common with handheld devices). The alignment operation 206 may use any suitable technique(s) for image alignment, which is also sometimes referred to as image registration. In some embodiments, the preprocessed input image frames 202 can be aligned both geometrically and photometrically. In particular embodiments, the alignment operation 206 can use global Oriented FAST and Rotated BRIEF (ORB) features and local features from a block search to identify how to align the image frames. Note, however, that this disclosure is not limited to any particular technique(s) for aligning image frames.

The aligned versions of the input image frames 202 are provided to an image blending operation 208, which generally operates to combine image data contained in the aligned input image frames 202 in order to generate a blended image. For instance, the blending operation 208 may process the aligned input image frames 202 in order to modify portions of the selected reference frame using image data from one or more non-reference frames. As a particular example, the blending operation 208 may take the reference frame and replace one or more portions of the reference frame containing motion with one or more corresponding portions of shorter-exposure image frames, thereby producing the blended image. In some cases, the blending operation 208 may perform a weighted blending operation to combine the pixel values contained in the aligned image frames 202. Note, however, that this disclosure is not limited to any particular technique(s) for combining image frames. Also note that, depending on the implementation, the blending operation 208 can often introduce blur into one or more portions of the resulting blended image.

The blended image is provided to an image demosaic operation 210, which generally operates to convert image data produced using a Bayer filter array or other color filter array into reconstructed red-green-blue (RGB) data or other image data in order to generate a demosaiced image. For example, the demosaic operation 210 can perform various interpolations to fill in missing information, such as by estimating other colors' image data for each pixel. When using a Bayer filter array or some other types of color filter arrays, approximately twice as many pixels may capture image data using green filters compared to pixels that capture image data using red or blue filters. This can introduce non-uniformities into the captured image data, such as when the red and blue image data each have a lower signal-to-noise ratio (SNR) and a lower sampling rate compared to the green image data. Among other things, the green image data can capture high-frequency image content more effectively than the red and blue image data. The demosaic operation 210 can take information captured by at least one highly-sampled channel (such as the green channel and/or the white channel) and use that information to correct limitations of lower-sampled channels (such as the red and blue channels), which can help to reintroduce high-frequency image content into the red and blue image data. Note, however, that this disclosure is not limited to any particular technique(s) for demosaicing images. Also note that, depending on the implementation, the demosaic operation 210 can often introduce blur into one or more portions of the resulting demosaiced image.

The demosaiced image is provided to a noise filtering operation 212, which generally operates to process the demosaiced image and remove noise from the demosaiced image in order to generate a filtered image. For example, the noise filtering operation 212 may be used to remove sampling, interpolation, and aliasing artifacts and noise in sub-sampled image color channels (such as the red and blue channels) of the demosaiced image using information from at least one higher-sampled color channel (such as the green channel and/or the white channel) of the demosaiced image. The noise filtering operation 212 may also or alternatively be used to filter the image data of the demosaiced image in order to remove noise from object edges, which can help to provide cleaner edges to objects captured in the demosaiced image. The noise filtering operation 212 may use any suitable technique(s) for filtering image data, such as spatial noise filtering. Note, however, that this disclosure is not limited to any particular technique(s) for filtering image data. Also note that, depending on the implementation, the noise filtering operation 212 can often introduce blur into one or more portions of the resulting filtered image.

The filtered image is provided to an image sharpening operation 214, where the filtered image represents a blurry image. The phrase "blurry image" refers to an image containing some amount of blur, which may be due to movement of an electronic device 101 or other device during image capture, one or more other image processing operations (such as those performed in the image processing pipeline 200), or other cause(s). The sharpening operation 214 generally operates to sharpen the filtered image and generate a sharpened image. The phrase "sharpened image" refers to an image generated using an original blurry image that contains less blur than the original blurry image. Even if the sharpened image might still contain some amount of blur, the amount of blur is less than in the blurry image. As described below, the sharpening operation 214 can generate an edge enhancement mask and a gain mask based on a filtered or other blurry image, generate a halo-suppressed edge mask based on the edge enhancement mask and the gain mask, and generate a sharpened image based on the blurry image and the halo-suppressed edge mask. Among other things, this allows the sharpening operation 214 to provide texture-preserving halo suppression.

The sharpened image is provided to a tone mapping operation 216, which generally operates to adjust colors in the sharpened image. This can be useful or important in various applications, such as when generating HDR images. For instance, since generating an HDR image often involves capturing multiple images of a scene using different exposures and combining the captured images to produce the HDR image, this type of processing can often result in the creation of unnatural tone within the HDR image. The tone mapping operation 216 can therefore use one or more color mappings to adjust the colors contained in the sharpened image. The output of the tone mapping operation 216 can represent an output image 218, which may represent a final image of the scene. Note, however, that the output image 218 may undergo one or more additional post-processing operations (if desired) to produce a final image of the scene. The tone mapping operation 216 may use any suitable technique(s) to perform tone mapping, such as one or more global tone mapping techniques and/or one or more local tone mapping techniques. As a particular example, the tone mapping operation 216 may multiply each pixel of the sharpened image by a corresponding gain value to help ensure that the resulting output image 218 can be displayed appropriately.

Although FIG. 2 illustrates one example of an image processing pipeline 200 supporting texture-preserving halo suppression, various changes may be made to FIG. 2. For example, various components and functions in FIG. 2 may be combined, further subdivided, replicated, rearranged, or omitted according to particular needs. Also, various additional components and functions may be used in FIG. 2. In addition, the specific image processing pipeline 200 described above is for illustration and explanation only. Various image processing pipelines have been developed, and additional image processing pipelines are sure to be developed in the future. This disclosure is not limited to any specific implementation of an image processing pipeline 200 or even to use within an image processing pipeline. In general, the techniques for texture-preserving halo suppression that are described in this patent document may be used to process blurry images in any other image processing pipeline or other architecture.

Figure 3:
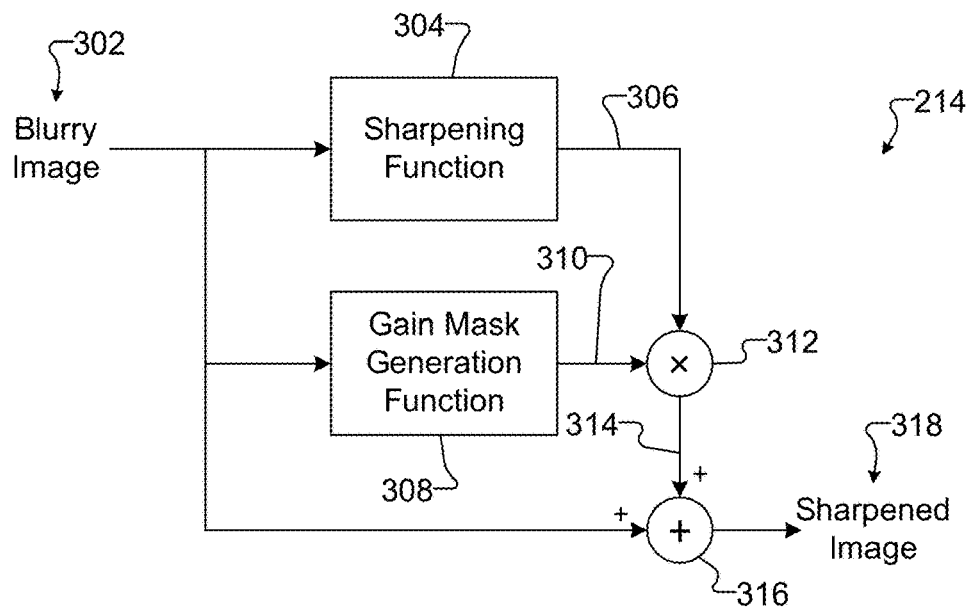
FIG. 3 illustrates an example image sharpening operation in the image processing pipeline of FIG. 2 in accordance with this disclosure.

FIG. 3 illustrates an example image sharpening operation 214 in the image processing pipeline 200 of FIG. 2 in accordance with this disclosure. For ease of explanation, the image sharpening operation 214 shown in FIG. 3 is described as being implemented on or supported by the electronic device 101 in the network configuration 100 of FIG. 1, where the electronic device 101 includes or supports the image processing pipeline 200 of FIG. 2. However, the image sharpening operation 214 shown in FIG. 3 could be used with any other suitable device(s) and in any other suitable system(s), such as when the image sharpening operation 214 is implemented on or supported by the server 106. The image sharpening operation 214 is also not limited to use with the specific image processing pipeline 200 shown in FIG. 2.

As shown in FIG. 3, the image sharpening operation 214 generally operates to receive and process blurry images 302, such as filtered images generated by the noise filtering operation 212. As noted above, each blurry image 302 represents an image containing some amount of blur, which may be due to movement of an electronic device 101 or other device during image capture, one or more other image processing operations (such as those performed in the image processing pipeline 200), or other cause(s). Each blurry image 302 is provided to a sharpening function 304, which generally operates to process each blurry image 302 and generate a corresponding edge enhancement mask 306. Each edge enhancement mask 306 represents a mask that can be applied to a blurry image 302 in order to reduce the amount of blur contained in one or more portions of the blurry image 302. The sharpening function 304 may use any suitable technique(s) for generating edge enhancement masks 306 for blurry images 302. In some embodiments, for instance, the sharpening function 304 may support the use of unsharp-masking (USM), which is an image processing technique used to create a negative mask that is typically combined with a positive image to produce an image that is less blurry than the original.

Figure 4:
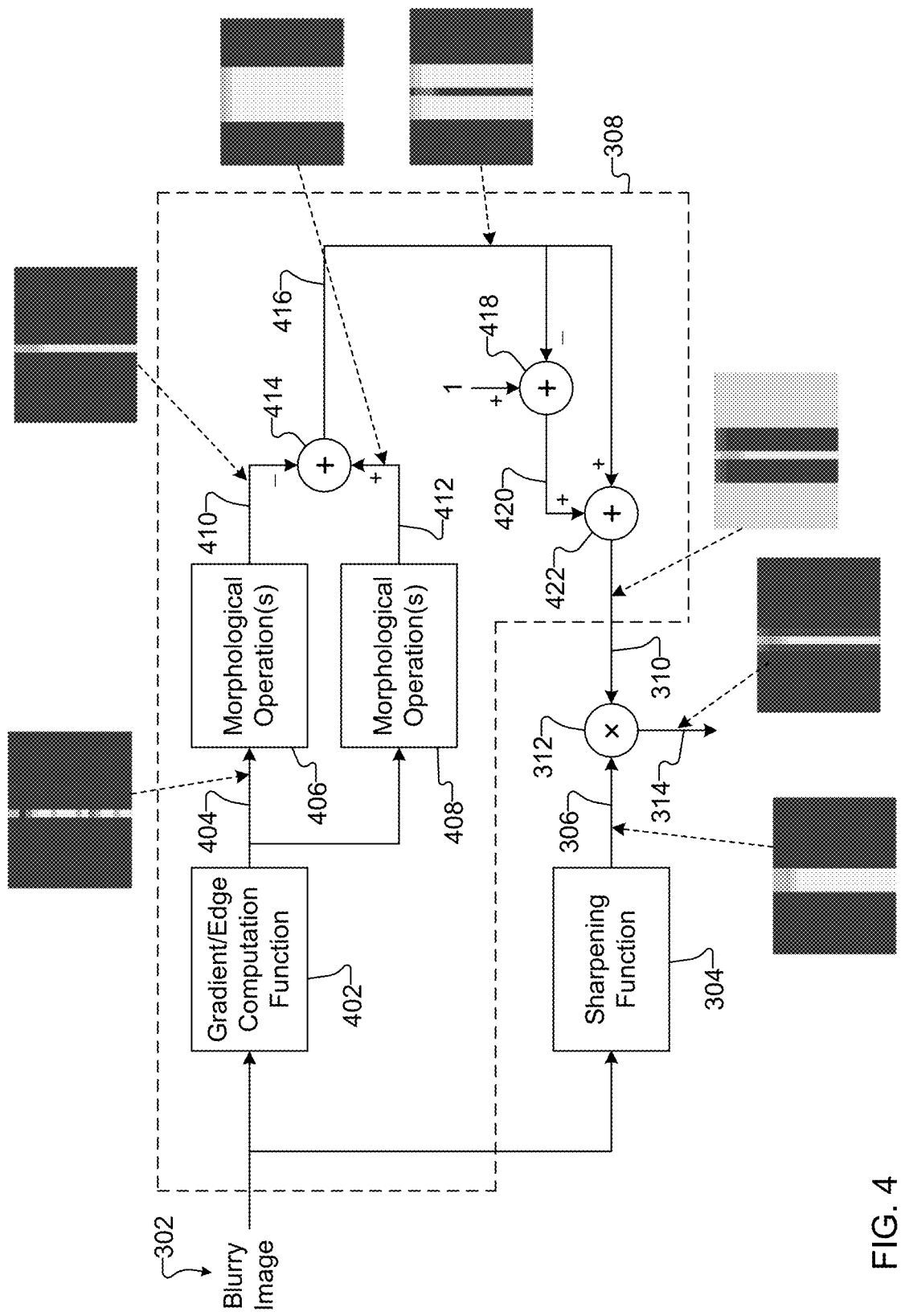
FIGS. 4 and 5 illustrate example gain mask generation functions in the image sharpening operation of FIG. 3 in accordance with this disclosure.
Figure 5:
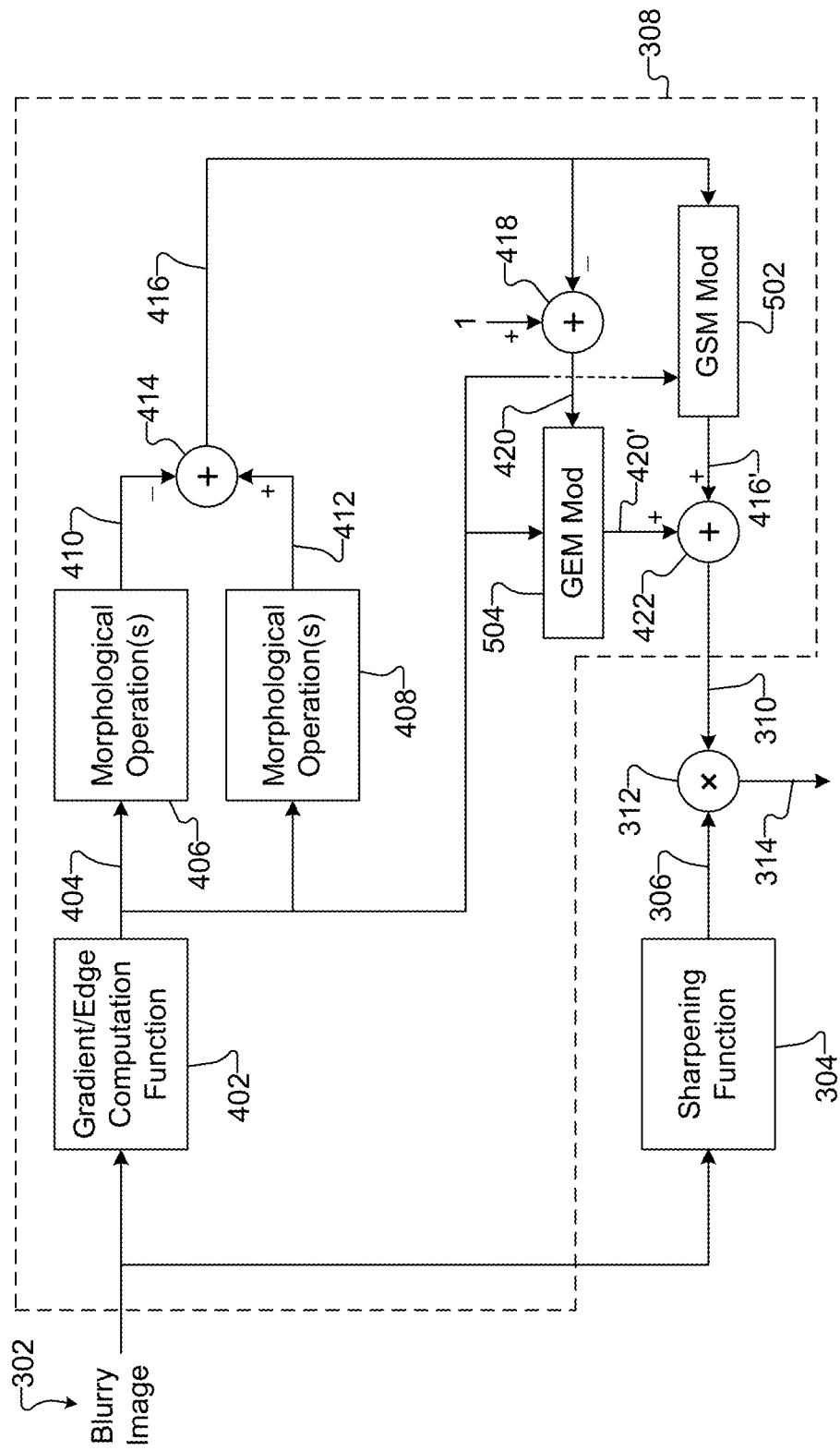

As noted above, sharpening images using an algorithm like USM typically has the effect of introducing halos (thicker object edges), which can make the resulting images look unnatural. To help compensate for this, the image sharpening operation 214 operates to alter or adjust the edge enhancement mask 306 for each blurry image 302 prior to application of the edge enhancement mask 306 to the blurry image 302. More specifically, the edge enhancement mask 306 is modified in order to reduce the gains applied in regions where halos are likely to form. This is accomplished in FIG. 3 by providing each blurry image 302 to a gain mask generation function 308, which generally operates to process the blurry image 302 and generate a corresponding gain mask 310. Each gain mask 310 represents a mask that can be applied to an edge enhancement mask 306 in order to reduce or minimize halos resulting from use of the edge enhancement mask 306, such as by reducing the gains to be applied in regions of the blurry image 302 where one or more halos are likely to form. The gain mask generation function 308 may use any suitable technique(s) for generating gain masks 310 for blurry images 302 in order to produce texture-preserving halo suppression. Example implementations of the gain mask generation function 308 are shown in FIGS. 4 and 5, which are discussed below.

A combiner function 312 receives the edge enhancement mask 306 and the gain mask 310 for each blurry image 302 and combines the edge enhancement mask 306 and the gain mask 310. This results in the generation of a halo-suppressed edge mask 314, which represents a mask that can be applied to a blurry image 302 in order to reduce or minimize the amount of blur contained in one or more portions of the blurry image 302 while (at the same time) reducing or avoiding the creation of halos in the resulting sharpened image. The combiner function 312 may use any suitable technique(s) to combine edge enhancement masks 306 and gain masks 310. In some embodiments, for instance, the combiner function 312 may perform a pixel-wise multiplication of an edge enhancement mask 306 and an associated gain mask 310, which can involve multiplying each pixel value of the edge enhancement mask 306 by the corresponding pixel value in the same position of the gain mask 310.

A combiner function 316 receives the blurry image 302 and the halo-suppressed edge mask 314 and combines the blurry image 302 and the halo-suppressed edge mask 314. This results in the generation of a sharpened image 318 corresponding to the blurry image 302, where the sharpened image 318 contains less blur than the blurry image 302. The combiner function 316 may use any suitable technique(s) to combine blurry images 302 and halo-suppressed edge masks 314. In some embodiments, for instance, the combiner function 316 may perform a pixel-wise addition of a blurry image 302 and a halo-suppressed edge mask 314, which can involve adding each pixel value of the blurry image 302 and the corresponding pixel value in the same position of the halo-suppressed edge mask 314.

In this way, the image sharpening operation 214 is able to provide image sharpening while reducing or minimizing halos that are introduced using unsharp-masking or other sharpening function 304. Moreover, this can be accomplished without losing significant fine textural details within the blurry images 302 and without introducing other undesirable artifacts. Among other reasons, this is because the gain mask 310 can be generated and applied to the associated edge enhancement mask 306, thereby adjusting how the resulting halo-suppressed edge masks 314 adjusts the blurry image 302. Also, the gain mask 310 can be generated so that halos are suppressed while edges and finer textures are enhanced/preserved using the resulting halo-suppressed edge masks 314. In some embodiments, the operation of the image sharpening operation 214 may be expressed as follows.

$$E'=G(E)$$

Here, E represents an edge enhancement mask 306, G represents an operator that reduces halos (a gain mask 310), and E' represents a halo-suppressed edge mask 314. In particular embodiments, the operation of the image sharpening operation 214 may be expressed as follows.

$$E' = G * E$$

Note that while a multiplicative function is shown here, other functions involving the edge enhancement mask 306 and a gain operator as defined by the gain mask 310 may be used here. In some cases, a halo-suppressed edge mask 314 can be added to a blurry image 302 in order to produce a sharpened image 318 in which halos are reduced or minimized but finer textures are preserved.

Although FIG. 3 illustrates one example of an image sharpening operation 214 in the image processing pipeline 200 of FIG. 2, various changes may be made to FIG. 3. For example, various components and functions in FIG. 3 may be combined, further subdivided, replicated, rearranged, or omitted according to particular needs. Also, various additional components and functions may be used in FIG. 3.

FIGS. 4 and 5 illustrate example gain mask generation functions 308 in the image sharpening operation 214 of FIG. 3 in accordance with this disclosure. For ease of explanation, the gain mask generation functions 308 shown in FIGS. 4 and 5 are described as being implemented on or supported by the electronic device 101 in the network configuration 100 of FIG. 1, where the electronic device 101 includes or supports the image processing pipeline 200 of FIG. 2. However, the gain mask generation functions 308 shown in FIGS. 4 and 5 could be used with any other suitable device(s) and in any other suitable system(s), such as when the gain mask generation functions 308 are implemented on or supported by the server 106. The gain mask generation functions 308 are also not limited to use with the specific image processing pipeline 200 shown in FIG. 2.

As shown in one example embodiment of the gain mask generation function 308 in FIG. 4, the blurry image 302 is provided to a gradient or edge computation function 402, which generally operates to process the blurry image 302 and generate an initial edge mask 404. The initial edge mask 404 represents an initial identification of edges captured within the blurry image 302, such as edges and textures of objects in the foreground and background of a scene. The initial edge mask 404 may be generated in any suitable manner, such as when the gradient or edge computation function 402 calculates gradients between neighboring pixels in the blurry image 302 and identifies instances where the gradients exceed a threshold value. The gradient or edge computation function 402 may use any suitable technique(s) for identifying gradients or edges in blurry images 302. Note, however, that this disclosure is not limited to any particular technique(s) for generating initial edge masks.

The initial edge mask 404 here can represent a non-binary edge mask, such as when values between zero and one may be included in the initial edge mask 404. This allows the initial edge mask 404 to represent the relative strengths of various edges in the blurry image 302 using potentially numerous values, rather than just indicating if an edge is present or not. In some cases, values of zero can indicate no edges, values of one can indicate very strong edges, and values in between can represent non-zero edge strengths. The ability to include values other than zero and one can allow the initial edge mask 404 to identify features such as textures (including finer textural features) of objects in blurry images 302. Knowledge of the locations of edges and the strengths of those edges in the blurry images 302 can be useful since halos are often formed around object edges, so this information can be used to determine which portions of an edge enhancement mask 306 should be modulated or otherwise processed in order to reduce or minimize the halos. One example of an edge mask 404 is shown in FIG. 4, where the edge mask 404 identifies an edge (but not necessarily in a very clear manner).

The initial edge mask 404 is provided to one or more first morphological operations 406 and one or more second morphological operations 408. The one or more first morphological operations 406 generally operate to process values in the initial edge mask 404 and generate a refined edge mask 410. The one or more first morphological operations 406 can implement a morphological transform, which generally represents a transform in which the value of any pixel can be replaced by a minimum or maximum value within an N×N window surrounding that pixel. For instance, the one or more first morphological operations 406 can be implemented using an erosion operation followed by a dilation operation. The one or more second morphological operations 408 also generally operate to process values in the initial edge mask 404 and generate a thickened edge mask 412. The one or more second morphological operations 408 can also implement a morphological transform, such as when the one or more second morphological operations 408 can be implemented using an erosion operation (which may not be followed by a dilation operation).

The overall result here can be that the one or more first morphological operations 406 fill in gaps in the initial edge mask 404 (if any) and thin one or more edges identified in the initial edge mask 404 (if necessary). The one or more second morphological operations 408 thicken one or more edges identified in the initial edge mask 404. One example of a refined edge mask 410 is shown in FIG. 4, where the refined edge mask 410 identifies the same edge as the initial edge mask 404 but more clearly defines the edge. Also, one example of a thickened edge mask 412 is shown in FIG. 4, where the thickened edge mask 412 has been expanded in thickness relative to the edge in the initial edge mask 404. The refined edge mask 410 and the thickened edge mask 412 may represent non-binary masks.

A combiner function 414 receives the refined edge mask 410 and the thickened edge mask 412 for each blurry image 302 and combines the refined edge mask 410 and the thickened edge mask 412. This results in the generation of a gain suppression mask 416, which identifies differences between thinned edges and thickened edges as respectively identified in the refined edge mask 410 and the thickened edge mask 412. As a result, the gain suppression mask 416 can identify those areas of the blurry image 302 surrounding edges (but not including the edges themselves). These areas can represent areas in which halos may form and where halo suppression may be needed. The combiner function 414 may use any suitable technique(s) to combine refined edge masks 410 and thickened edge masks 412. In some embodiments, for instance, the combiner function 414 may subtract the values of the refined edge mask 410 from the values of the thickened edge mask 412. One example of a gain suppression mask 416 is shown in FIG. 4, where the gain suppression mask 416 identifies the areas on two sides of an edge. The gain suppression mask 416 may represent a non-binary mask.

A combiner function 418 receives the gain suppression mask 416 and a mask containing all "one" values for each blurry image 302 and combines the gain suppression mask 416 and the mask containing all "one" values. This results in the generation of a gain enhancement mask 420. While the gain suppression mask 416 can identify areas where gains may be suppressed (such as in order to avoid the creation of halos), the gain enhancement mask 420 can identify areas where gains can be increased or enhanced (such as in areas where there is little or no concern regarding the creation of halos). The combiner function 418 may use any suitable technique(s) to combine gain suppression masks 416 and masks containing all "one" values. For instance, the combiner function 418 may subtract the values of the gain suppression mask 416 from the "one" values. The gain enhancement mask 420 may represent a non-binary mask.

A combiner function 422 receives the gain suppression mask 416 and the gain enhancement mask 420 for each blurry image 302 and combines the gain suppression mask 416 and the gain enhancement mask 420. This results in the generation of a gain mask 310, which represents a mask applied to the edge enhancement mask 306 in order to reduce or minimize halos resulting from the use of the edge enhancement mask 306. For instance, the gain mask 310 may be used to reduce the gains to be applied in regions of the blurry image 302 where one or more halos are likely to form. The combiner function 422 may use any suitable technique(s) to combine gain suppression masks 416 and gain enhancement masks 420. For instance, the combiner function 422 may add the values of the gain suppression mask 416 to the values of the gain enhancement mask 420. The gain mask 310 may represent a non-binary mask.

One example of a gain mask 310 is shown in FIG. 4, where the gain mask 310 clearly identifies the areas around the edge identified in the initial edge mask 404. One example of an edge enhancement mask 306 generated by the sharpening function 304 is also shown in FIG. 4. As can be seen here, the edge enhancement mask 306 generated by the sharpening function 304 identifies a relatively thick edge, which is why halos are often created around object edges when the sharpening function 304 is used alone. The combiner function 312 described above uses the gain mask 310 in order to modify the edge enhancement mask 306 and generate a halo-suppressed edge mask 314. One example of a halo-suppressed edge mask 314 is shown in FIG. 4, and it can be seen that the halo-suppressed edge mask 314 defines the edge in the blurry image 302 more clearly than the edge enhancement mask 306. In some cases, the halo-suppressed edge mask 314 can include larger values along the actual edge, somewhat smaller values in areas adjacent to the actual edge, and even smaller values in areas farther from the actual edge. This can help to reduce or minimize halo creation when the halo-suppressed edge mask 314 is combined with the corresponding blurry image 302 to produce a sharpened image 318. For instance, by multiplying the values of the blurry image 302 by the values of the gain mask 310, gains of less than one can be applied in regions where halos are likely to form, while gains of one or more can be applied in regions where there are edges or textures.

As shown in another example embodiment of the gain mask generation function 308 in FIG. 5, the gain mask generation function 308 may be expanded to include a gain suppression mask (GSM) modulation function 502 and a gain enhancement mask (GEM) modulation function 504. The GSM modulation function 502 generally operates to modulate the gain suppression mask 416 based on edge features associated with the edges in the blurry image 302, which results in the generation of a modulated gain suppression mask 416'. The edge features used by the GSM modulation function 502 may identify different types of halos that might be created using the blurry image 302. For example, the GSM modulation function 502 can multiply the values in the gain suppression mask 416 by different multiplicative values depending on the strengths of the edge features identified in the gain suppression mask 416. As a particular example, the multiplicative values used to modulate the gain suppression mask 416 can be higher for weaker edge features and lower for stronger edge features. This can help to provide different gains for different types of halos. Thus, for instance, higher gains can be used for halos corresponding to weaker edges, which may represent possible textures. Lower gains can be used for halos corresponding to stronger edges, which may represent actual edges of objects in the blurry image 302.

The GEM modulation function 504 generally operates to modulate the gain enhancement mask 420 based on edge features associated with the edges in the blurry image 302, which results in the generation of a modulated gain enhancement mask 420'. The edge features used by the GEM modulation function 504 may identify different types of edges in the blurry image 302. For example, the GEM modulation function 504 can multiply the values in the gain enhancement mask 420 by different multiplicative values depending on whether the edges in the blurry image 302 are associated with negative enhancement or positive enhancement. A negative edge can refer to the side of an edge that has a lower value, and a positive edge can refer to the side of the edge that has a higher value. As a particular example, the multiplicative values used to modulate the gain enhancement mask 420 can be higher for edges associated with negative enhancement (negative edges) and lower for edges associated with positive enhancement (positive edges). In other words, negative edges can receive higher gains, while positive edges can receive lower gains. One reason for the different enhancements is that more enhancement on negative edges can result in better user experiences visually. Here, the modulated gain suppression mask 416' and the modulated gain enhancement mask 420' can be combined using the combiner function 422 to generate the gain mask 310.

Figure 6:
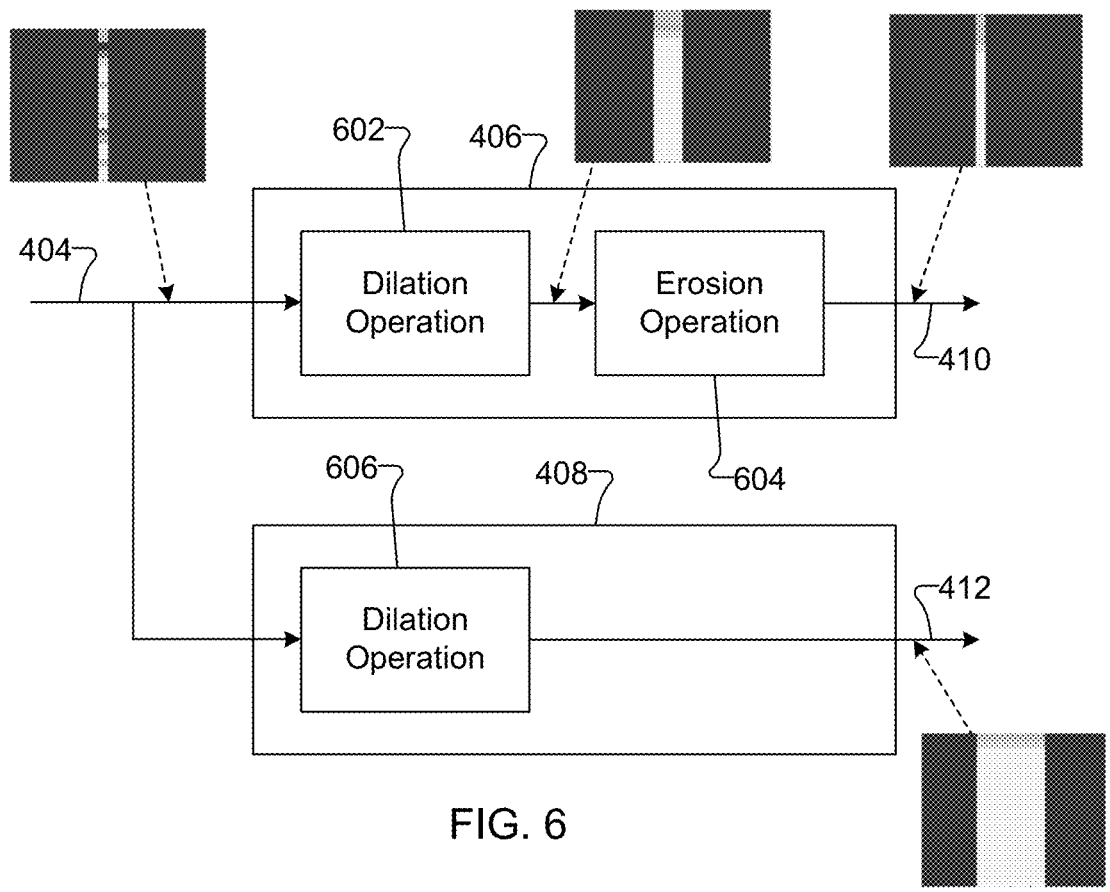
FIG. 6 illustrates example morphological operations in the gain mask generation functions of FIGS. 4 and 5 in accordance with this disclosure.

FIG. 6 illustrates example morphological operations 406 and 408 in the gain mask generation functions 308 of FIGS. 4 and 5 in accordance with this disclosure. As shown in FIG. 6, the first morphological operation(s) 406 can include a dilation operation 602 followed by an erosion operation 604, while the second morphological operation(s) 408 can include a dilation operation 606 (without an erosion operation). Dilation is an operation that "thickens" edges, such as by taking the maximum value in an N×N window surrounding a pixel and using that maximum value for the pixel. Among other things, this operation can help to fill in missing edge pixels. Note that the dilation operations 602 and 606 may or may not use the same value for N, meaning the dilation operations 602 and 606 may or may not use a common size for the N×N kernel. In this particular example, the dilation operation 602 is performed using a smaller kernel, so the edge is thickened by a smaller amount compared to the dilation operation 606.

Erosion is an operation that "thins" edges, such as by taking the minimum value in an N×N window surrounding a pixel and using that minimum value for the pixel. Note that the erosion operation 604 may or may not use the same value for N as either or both of the dilation operations 602 and 606, meaning the erosion operation 604 may or may not use a common size for the N×N kernel as one or more of the dilation operations 602 and 606. In this particular example, the erosion operation 604 is performed using a kernel having the same size as the dilation operation 602, which is why the size of the edge expands and then contracts back to its original size.

As described above, the GSM modulation function 502 modulates the gain suppression mask 416 based on edge features to generate a modulated gain suppression mask 416'. In the example above, the GSM modulation function 502 is described as being able to multiply the values in the gain suppression mask 416 by different multiplicative values depending on the strengths of the edge features identified in the gain suppression mask 416. However, it is also possible to modulate the gain suppression mask 416 based on other or additional edge characteristics, such as based on the coherences of the edge features, the orientations of the edge features, or any combination of strengths, coherences, and orientations of the edge features.

In some cases, the edge characteristics may be determined as follows. Assume a gradient structure tensor can be defined in the following manner $$G = \begin{bmatrix} G_{xx} & G_{xy} \\ G_{xy} & G_{yy} \end{bmatrix}$$

Here, the components of the tensor can be expressed as $G_{xx}=E[I_x^2]$, $G_{yy}=E[I_y^2]$, and $G_{xy}=E[I_x I_y]$. $E[\ ]$ denotes mathematical expectation, which may be approximated by averaging over a local window. Also, $I_x$ and $I_y$ are gradient images with respect to x and y (meaning partial derivatives of an image/with respect to x and y). In some embodiments, the gradient structure tensor can be determined directly using a Bayer image at full resolution in order to extract fine image structures. In particular embodiments, this may be accomplished using the approaches described in Zhou et al., "Gradient-Based Feature Extraction From Raw Bayer Pattern Images," IEEE Transactions on Image Processing 30, 2021, pgs. 5122-5137 (which is hereby incorporated by reference in its entirety). Once the gradient structure tensor is defined, eigenvalues of the tensor may be determined as follows.

$$\lambda_{1,2} = \frac{1}{2}\left[G_{xx} + G_{yy} \pm \sqrt{(G_{xx} - G_{yy})^2 + 4G_{xy}^2}\right]$$

Here, $\lambda_1$ is the dominant eigenvalue, and $\lambda_2$ is the secondary eigenvalue. Based on the eigenvalues, a measure of strength S of an image edge may be determined as follows.

$$S = \lambda_1$$

A measure of coherence C of an image edge may be determined as follows.

$$C = \frac{\lambda_1 - \lambda_2}{\lambda_1 + \lambda_2}$$

A measure of orientation $\theta$ of an image edge may be determined as follows.

$$\theta = 0.5 \arctan \frac{2G_{xy}}{G_{yy} - G_{xx}}$$

One or more of these values may be used to control the modulation of the gain suppression mask 416 by the GSM modulation function 502 based on each edge in a blurry image 302.

Figure 7:
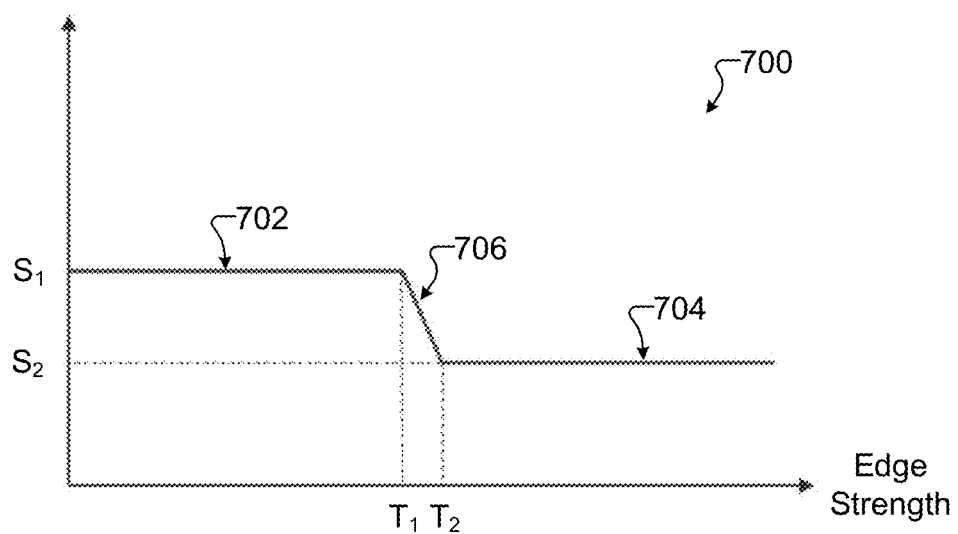
FIG. 7 illustrates an example graph plotting a suppression value used in modulating a gain suppression mask using the gain mask generation function of FIG. 5 in accordance with this disclosure.

As noted above, in some embodiments, the GSM modulation function 502 can multiply the values in the gain suppression mask 416 by different multiplicative values depending on the strengths, coherences, and/or orientations of the edge features identified in the gain suppression mask 416. FIG. 7 illustrates an example graph 700 plotting a suppression value used in modulating a gain suppression mask 416 using the gain mask generation function 308 of FIG. 5 in accordance with this disclosure. Here, a suppression value is used to suppress values in the gain suppression mask 416 by the GSM modulation function 502. In this particular example, smaller suppression values can be indicative of greater amounts of suppression, while larger suppression values can be indicative of lesser amounts of suppression.

As shown in FIG. 7, the graph 700 indicates that the suppression value varies based on the edge strength. Here, the suppression value can have a first value 702 (denoted $S_1$) for edge strengths below a first threshold (denoted $T_1$) and a second value 704 (denoted $S_2$) for edge strengths above a second threshold (denoted $T_2$). Here, less suppression may be applied for weaker edge strengths, and more suppression may be applied for stronger edge strengths. Among other things, this may allow more suppression around strong object edges and less suppression around finer textural details. The suppression value can optionally have a varying third value 706 for edge strengths between the two thresholds.

Note that other relationships between the suppression value and the edge strength may be used, such as when the suppression value is proportional to the edge strength. Also note that while two constant values $S_1$ and $S_2$ are used here, the graph 700 may include three or more constant values for the suppression value. Further, while the suppression value is based on edge strengths in FIG. 7, the suppression value may also or alternatively be based on edge coherences, edge orientations, and/or other edge characteristic(s). For instance, it may be possible to assign one constant value to the suppression value for higher-strength horizontal and vertical edges (meaning higher-strength edges having one or more specified orientations), assign another constant value to the suppression value for other higher-strength edges, and assign yet another constant value to the suppression value for lower-strength edges. In addition, the classifications of what constitute higher or lower edge strengths, higher or lower coherences, or higher or lower orientations (or any other classifications involving edge strengths, edge coherences, edge orientations, and/or other edge characteristics) may be performed in any suitable manner, such as by using user-defined thresholding, automatic traditional classifiers, or machine learning-based classifiers.

Although FIGS. 4 through 7 illustrate examples of gain mask generation functions 308 in the image sharpening operation 214 of FIG. 3 and related details, various changes may be made to FIGS. 4 through 7. For example, various components and functions in FIGS. 4 and 5 may be combined, further subdivided, replicated, rearranged, or omitted according to particular needs. Also, various additional components and functions may be used in FIGS. 4 and 5. Further, any suitable morphological operations 406, 408 or other operations may be used in FIG. 6 to generate thicker and thinner edge masks. In addition, the specific graph 700 shown in FIG. 7 is for illustration and explanation only, and any other suitable approach may be used to identify a level of suppression for a gain suppression mask 416.

Figure 8A:
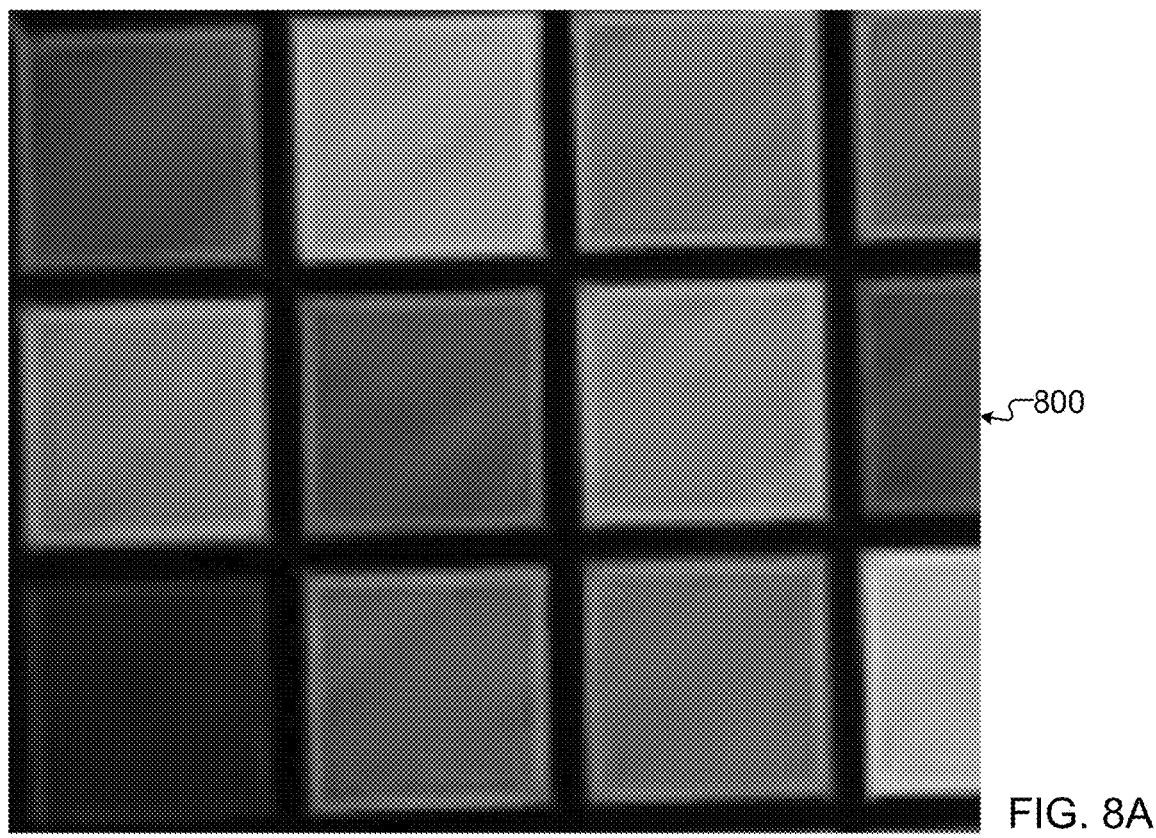
FIGS. 8A and 8B illustrate example results that may be obtained using texture-preserving halo suppression in accordance with this disclosure.
Figure 8B:
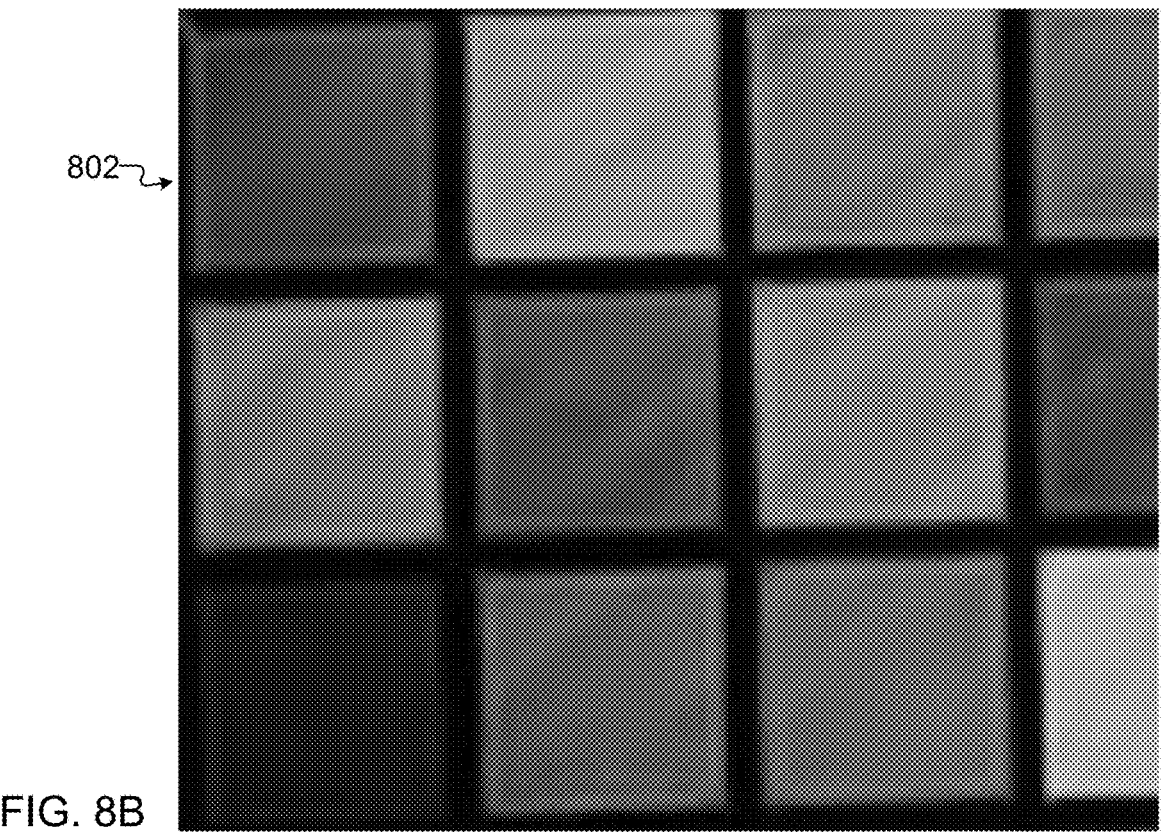

FIGS. 8A and 8B illustrate example results that may be obtained using texture-preserving halo suppression in accordance with this disclosure. More specifically, FIGS. 8A and 8B illustrate example results that may be obtained using the image processing pipeline 200 of FIG. 2. Note, however, that the image processing pipeline 200 may be used in any other suitable manner.

In FIG. 8A, an image 800 of a scene has been produced using standard sharpening, such as by using unsharp-masking. The scene here includes a number of color tiles, where each color tile has a uniform color. However, because of the use of unsharp-masking or other standard sharpening, various tiles have distinct halos. This can be seen in FIG. 8A, where various color tiles appear to include borders of lighter colors. These are halos generated as a result of using standard sharpening. Since each of the color tiles has a uniform color, the border of lighter color around a specific color tile represents an artifact. These types of artifacts can be distracting and result in images that appear unnatural.

In FIG. 8B, the image processing pipeline 200 (including the gain mask generation function 308 of the image sharpening operation 214) has been applied to produce an image 802. The image 802 captures the same scene as the image 800, including the same color tiles. As can be seen in FIG. 8B, the image 802 includes reduced or minimized halos around various color tiles. This indicates that the image processing pipeline 200, which supports texture-preserving halo suppression, can be used to reduce halos around objects in scenes. Moreover, this can be done in a manner that preserves finer textural details in the resulting images.

Although FIGS. 8A and 8B illustrate one example of results that may be obtained using texture-preserving halo suppression, various changes may be made to FIGS. 8A and 8B. For example, the actual contents of images can vary widely, and FIGS. 8A and 8B do not limit the scope of this disclosure to any particular type of image contents. In general, texture-preserving halo suppression can be performed with any suitable image data related to any suitable scenes being imaged.

Figure 9:
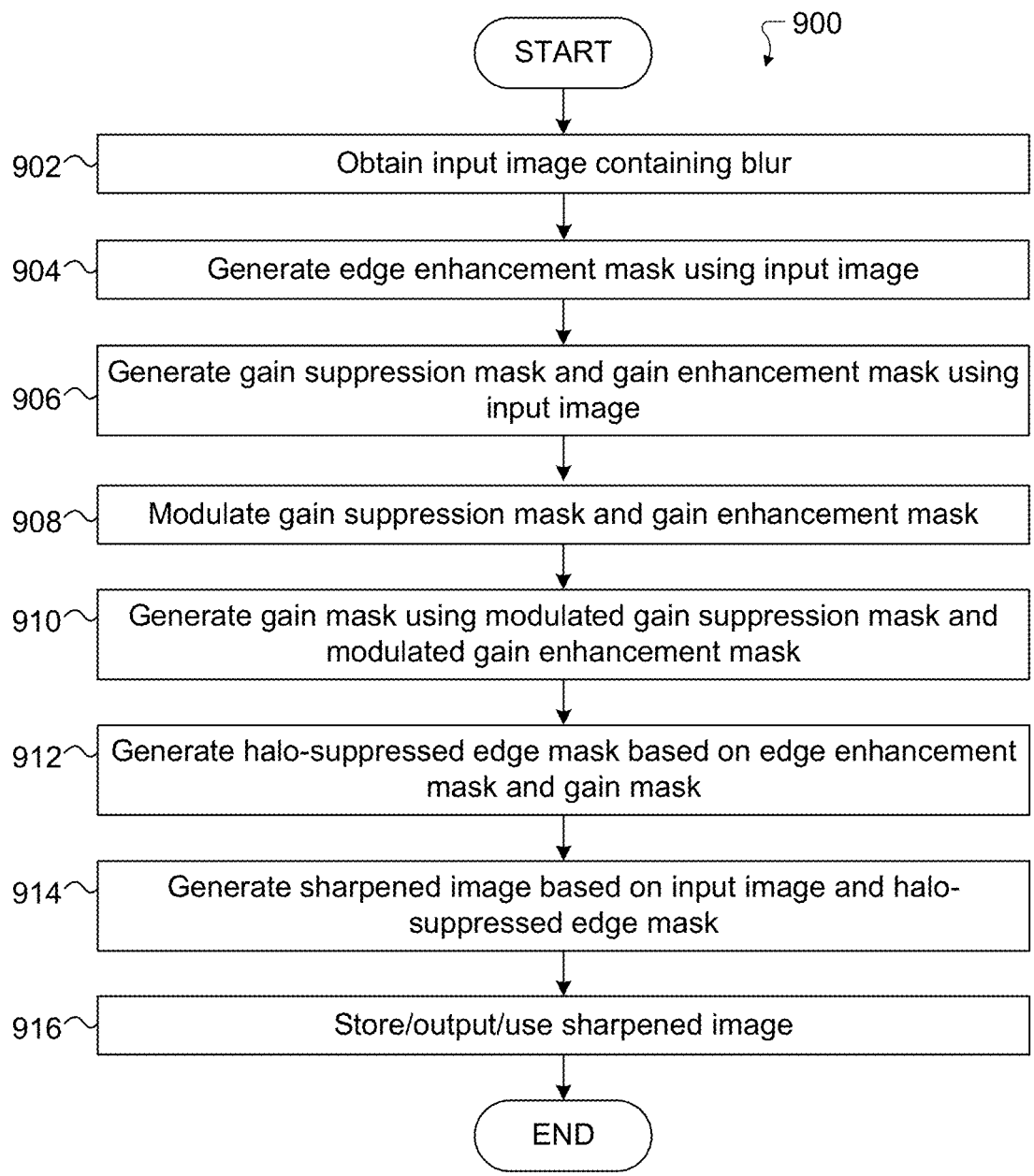
FIG. 9 illustrates an example method for texture-preserving halo suppression in accordance with this disclosure.

FIG. 9 illustrates an example method 900 for texture-preserving halo suppression in accordance with this disclosure. For ease of explanation, the method 900 shown in FIG. 9 is described as being performed by the electronic device 101 in the network configuration 100 of FIG. 1, where the electronic device 101 can implement the image processing pipeline 200 shown in FIG. 2. However, the method 900 shown in FIG. 9 could be performed by any other suitable device(s) and in any other suitable system(s), such as when the method 900 is performed using the server 106. The method 900 is also not limited to use with the specific image processing pipeline 200 shown in FIG. 2.

As shown in FIG. 9, an input image containing blur is obtained at step 902. This may include, for example, the processor 120 of the electronic device 101 obtaining one or more input image frames 202 using one or more imaging sensors 180. In some cases, multiple input image frames 202 may include at least two input image frames captured using different capture conditions, such as different ISO values, exposure times, image contents, or other exposure settings. This may also include the processor 120 of the electronic device 101 processing the one or more input image frames 202 using various operations in an image processing pipeline 200. As a particular example, the processor 120 of the electronic device 101 may perform an image blending operation 208, an image demosaic operation 210, and/or a noise filtering operation 212, any of which may introduce blur into one or more portions of the resulting image. This can lead to the generation of a blurry image 302. An edge enhancement mask is generated using the input image at step 904. This may include, for example, the processor 120 of the electronic device 101 performing the sharpening function 304 to process the blurry image 302 and generate an edge enhancement mask 306. In some cases, the sharpening function 304 can generate the edge enhancement mask 306 using unsharp-masking.

A gain mask is also generated based on the blurry image 302. For instance, a gain suppression mask and a gain enhancement mask are generated at step 906. This may include, for example, the processor 120 of the electronic device 101 performing the gain mask generation function 308 to process the blurry image 302 and generate a gain mask 310. As a particular example, this may include the processor 120 of the electronic device 101 performing the gradient or edge computation function 402 to generate an initial edge mask 404 and performing the morphological operations 406 and 408 to respectively generate a refined edge mask 410 and a thickened edge mask 412. This may also include the processor 120 of the electronic device 101 performing the combiner function 414 to combine the refined edge mask 410 and the thickened edge mask 412 to generate a gain suppression mask 416 and performing the combiner function 418 to combine the gain suppression mask 416 and a mask containing all "one" values to generate a gain enhancement mask 420. The gain suppression mask and the gain enhancement mask may optionally be modulated at step 908. This may include, for example, the processor 120 of the electronic device 101 performing the GSM modulation function 502 and the GEM modulation function 504 to respectively modulate the gain suppression mask 416 and the gain enhancement mask 420. In some cases, the gain suppression mask 416 can be modulated based on edges in the blurry image 302, where multiplicative values for modulating the gain suppression mask 416 are based on edge strengths, edge coherences, and/or edge orientations. Also, in some cases, the gain enhancement mask 420) can be modulated based on the edges in the blurry image 302, where multiplicative values for modulating the gain enhancement mask 420 are based on negative enhancements or positive enhancements associated with the edges.

A gain mask is generated using the (optionally modulated) gain suppression mask and the (optionally modulated) gain enhancement mask at step 910. This may include, for example, the processor 120 of the electronic device 101 performing the combiner function 422 to combine the gain suppression mask 416 or the modulated gain suppression mask 416' and the gain enhancement mask 420 or the modulated gain enhancement mask 420'. A halo-suppressed edge mask is generated based on the edge enhancement mask and the gain mask at step 912. This may include, for example, the processor 120 of the electronic device 101 performing the combiner function 312 to combine the edge enhancement mask 306 and the gain mask 310 to generate a halo-suppressed edge mask 314. A sharpened image is generated based on the input image and the halo-suppressed edge mask at step 914. This may include, for example, the processor 120 of the electronic device 101 performing the combiner function 316 to combine the blurry image 302 and the halo-suppressed edge mask 314 to generate a sharpened image 318.

The sharpened image is stored, output, or used in some manner at step 916. This may include, for example, the processor 120 of the electronic device 101 performing the tone mapping operation 216 or other post-processing operation(s) to generate an output image 218. The sharpened image 318 or the output image 218 may be displayed on the display 160 of the electronic device 101, saved to a camera roll stored in a memory 130 of the electronic device 101, or attached to a text message, email, or other communication to be transmitted from the electronic device 101. Of course, the sharpened image 318 or the output image 218 could be used in any other or additional manner.

Although FIG. 9 illustrate one example of a method 900 for texture-preserving halo suppression, various changes may be made to FIG. 9. For example, while shown as a series of steps, various steps in FIG. 9 may overlap, occur in parallel, occur in a different order, or occur any number of times (including zero times).

It should be noted that the functions shown in or described with respect to FIGS. 2 through 9 can be implemented in an electronic device 101, server 106, or other device in any suitable manner. For example, in some embodiments, at least some of the functions shown in or described with respect to FIGS. 2 through 9 can be implemented or supported using one or more software applications or other software instructions that are executed by the processor 120 of the electronic device 101, server 106, or other device. In other embodiments, at least some of the functions shown in or described with respect to FIGS. 2 through 9 can be implemented or supported using dedicated hardware components. In general, the functions shown in or described with respect to FIGS. 2 through 9 can be performed using any suitable hardware or any suitable combination of hardware and software/firmware instructions. Also, the functions shown in or described with respect to FIGS. 2 through 9 can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining, using at least one processing device of an electronic device, an input image containing blur;
    generating, using the at least one processing device, an edge enhancement mask and a non-binary gain mask based on the input image, wherein the non-binary gain mask contains pixel-wise gain operator values including at least one of zero or one and at least one value between zero and one;
    generating, using the at least one processing device, a halo-suppressed edge mask based on the edge enhancement mask and the non-binary gain mask; and
    generating, using the at least one processing device, a sharpened image based on the input image and the halo-suppressed edge mask;
    wherein generating the non-binary gain mask comprises:
        generating a non-binary initial edge mask based on a gradient computation performed using the input image;
        generating a non-binary refined edge mask based on a first morphological operation performed using the non-binary initial edge mask; and
        generating a non-binary thickened edge mask based on a second morphological operation performed using the non-binary initial edge mask, and
    wherein each of the first morphological operation and the second morphological operation comprises a transform that replaces a value for at least one pixel with one of a minimum pixel value or a maximum pixel value within a window of pixels surrounding the at least one pixel.

2. The method of claim 1, wherein generating the non-binary gain mask further comprises:
    combining the non-binary refined edge mask and the non-binary thickened edge mask to generate a non-binary gain suppression mask;
    generating a non-binary gain enhancement mask based on the non-binary gain suppression mask; and
    generating the non-binary gain mask based on the non-binary gain enhancement mask and the non-binary gain suppression mask.

3. The method of claim 1, wherein:
    the first morphological operation comprises a first dilation operation followed by an erosion operation; and
    the second morphological operation comprises a second dilation operation.

4. The method of claim 2, wherein generating the non-binary gain mask further comprises:
    modulating the non-binary gain suppression mask based on edges in the input image, wherein first multiplicative values for modulating the non-binary gain suppression mask are based on at least one of: edge strengths, edge coherences, and edge orientations; and
    modulating the non-binary gain enhancement mask based on the edges in the input image, wherein second multiplicative values for modulating the non-binary gain enhancement mask are based on negative enhancements or positive enhancements associated with the edges; and
    wherein the non-binary gain mask is based on the modulated gain enhancement mask and the modulated gain suppression mask.

5. The method of claim 1, wherein generating the edge enhancement mask comprises generating the edge enhancement mask using unsharp-masking (USM) of the input image.

6. The method of claim 1, wherein generating the halo-suppressed edge mask comprises performing a pixel-wise multiplication of the edge enhancement mask and the non-binary gain mask.

7. The method of claim 1, wherein generating the sharpened image comprises adding the halo-suppressed edge mask to the input image in order to generate the sharpened image.

8. An electronic device comprising:
    at least one processing device configured to:
        obtain an input image containing blur;
        generate an edge enhancement mask and a non-binary gain mask based on the input image, wherein the non-binary gain mask contains pixel-wise gain operator values including at least one of zero or one and at least one value between zero and one;
        generate a halo-suppressed edge mask based on the edge enhancement mask and the non-binary gain mask; and
        generate a sharpened image based on the input image and the halo-suppressed edge mask;
    wherein, to generate the non-binary gain mask, the at least one processing device is configured to:
        generate a non-binary initial edge mask based on a gradient computation performed using the input image;

generate a non-binary refined edge mask based on a first morphological operation performed using the non-binary initial edge mask; and
generate a non-binary thickened edge mask based on a second morphological operation performed using the non-binary initial edge mask, and
wherein each of the first morphological operation and the second morphological operation comprises a transform that replaces a value for at least one pixel with one of a minimum pixel value or a maximum pixel value within a window of pixels surrounding the at least one pixel.

9. The electronic device of claim 8, wherein, to generate the non-binary gain mask, the at least one processing device is further configured to:
combine the non-binary refined edge mask and the non-binary thickened edge mask to generate a non-binary gain suppression mask;
generate a non-binary gain enhancement mask based on the non-binary gain suppression mask; and
generate the non-binary gain mask based on the non-binary gain enhancement mask and the non-binary gain suppression mask.

10. The electronic device of claim 8, wherein:
the first morphological operation comprises a first dilation operation followed by an erosion operation; and
the second morphological operation comprises a second dilation operation.

11. The electronic device of claim 9, wherein, to generate the non-binary gain mask, the at least one processing device is further configured to:
modulate the non-binary gain suppression mask based on edges in the input image, wherein first multiplicative values for modulating the non-binary gain suppression mask are based on at least one of: edge strengths, edge coherences, and edge orientations; and
modulate the non-binary gain enhancement mask based on the edges in the input image, wherein second multiplicative values for modulating the non-binary gain enhancement mask are based on negative enhancements or positive enhancements associated with the edges; and
wherein the non-binary gain mask is based on the modulated gain enhancement mask and the modulated gain suppression mask.

12. The electronic device of claim 8, wherein, to generate the edge enhancement mask, the at least one processing device is configured to use unsharp-masking (USM) of the input image.

13. The electronic device of claim 8, wherein, to generate the halo-suppressed edge mask, the at least one processing device is configured to perform a pixel-wise multiplication of the edge enhancement mask and the non-binary gain mask.

14. The electronic device of claim 8, wherein, to generate the sharpened image, the at least one processing device is configured to add the halo-suppressed edge mask to the input image.

15. A non-transitory machine readable medium containing instructions that when executed cause at least one processor of an electronic device to:
obtain an input image containing blur;
generate an edge enhancement mask and a non-binary gain mask based on the input image, wherein the non-binary gain mask contains pixel-wise gain operator values including at least one of zero or one and at least one value between zero and one;
generate a halo-suppressed edge mask based on the edge enhancement mask and the non-binary gain mask; and
generate a sharpened image based on the input image and the halo-suppressed edge mask;
wherein the instructions that when executed cause the at least one processor to generate the non-binary gain mask comprise instructions that when executed cause the at least one processor to:
generate a non-binary initial edge mask based on a gradient computation performed using the input image;
generate a non-binary refined edge mask based on a first morphological operation performed using the non-binary initial edge mask; and
generate a non-binary thickened edge mask based on a second morphological operation performed using the non-binary initial edge mask, and
wherein each of the first morphological operation and the second morphological operation comprises a transform that replaces a value for at least one pixel with one of a minimum pixel value or a maximum pixel value within a window of pixels surrounding the at least one pixel.

16. The non-transitory machine readable medium of claim 15, wherein the instructions that when executed cause the at least one processor to generate the non-binary gain mask further comprise instructions that when executed cause the at least one processor to:
combine the non-binary refined edge mask and the non-binary thickened edge mask to generate a non-binary gain suppression mask;
generate a non-binary gain enhancement mask based on the non-binary gain suppression mask; and
generate the non-binary gain mask based on the non-binary gain enhancement mask and the non-binary gain suppression mask.

17. The non-transitory machine readable medium of claim 15, wherein:
the first morphological operation comprises a first dilation operation followed by an erosion operation; and
the second morphological operation comprises a second dilation operation.

18. The non-transitory machine readable medium of claim 16, wherein the instructions that when executed cause the at least one processor to generate the non-binary gain mask further comprise instructions that when executed cause the at least one processor to:
modulate the non-binary gain suppression mask based on edges in the input image, wherein first multiplicative values for modulating the non-binary gain suppression mask are based on at least one of: edge strengths, edge coherences, and edge orientations; and
modulate the non-binary gain enhancement mask based on the edges in the input image, wherein second multiplicative values for modulating the non-binary gain enhancement mask are based on negative enhancements or positive enhancements associated with the edges; and
wherein the non-binary gain mask is based on the modulated gain enhancement mask and the modulated gain suppression mask.

19. The non-transitory machine readable medium of claim 15, wherein the instructions that when executed cause the at least one processor to generate the halo-suppressed edge mask comprise:

instructions that when executed cause the at least one processor to perform a pixel-wise multiplication of the edge enhancement mask and the non-binary gain mask.

20. The non-transitory machine readable medium of claim 15, wherein the instructions that when executed cause the at least one processor to generate the sharpened image comprise:
instructions that when executed cause the at least one processor to add the halo-suppressed edge mask to the input image.

* * * * *